Dec. 18, 1962 J. KEMENY 3,068,834
MECHANICAL TRANSMITTER
Filed May 24, 1961
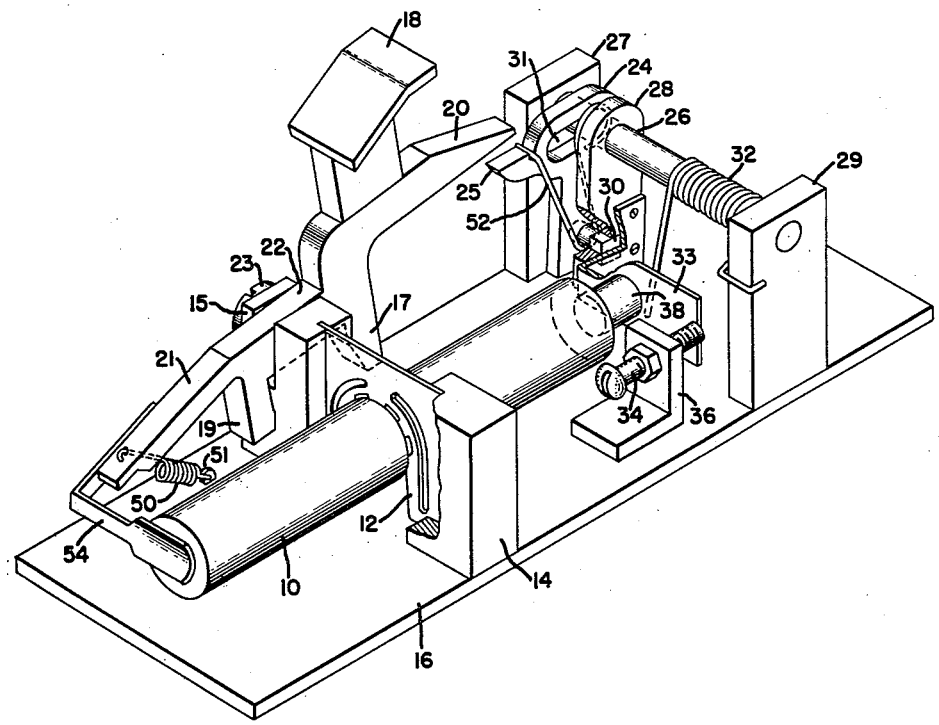
INVENTOR:
JULIUS KEMENY,
BY *Joseph Levinson*
HIS ATTORNEY.

United States Patent Office 3,068,834
Patented Dec. 18, 1962

3,068,834
MECHANICAL TRANSMITTER
Julius Kemeny, Liverpool, N.Y., assignor to General
Electric Company, a corporation of New York
Filed May 24, 1961, Ser. No. 112,350
5 Claims. (Cl. 116—137)

This invention relates to an improved mechanical transmitter for use in a remote control system, and more particularly to an improved structure for holding, actuating and damping the vibrating element of such a transmitter.

The type of transmitter contemplated herein utilizes a vibrator or rod having a predetermined resonant frequency which when struck generates a signal of that frequency. Signals generated thereby may be utilized to actuate remote receivers for performing control functions for such devices as television receivers. The proper operation of the remote receiver depends greatly on the manner in which the rod is supported, the way it is struck, and whether and in what manner the rod is damped after being energized.

It is an object of this invention to provide a new and improved structure for actuating a mechanical rod-type transmitter.

A further object of this invention is to provide a new and improved structure for mounting a rod for vibration at its natural frequency.

Still a further object of this invention is to provide a new and improved structure for actuating a rod transmitter and for sequentially providing damping thereto.

Still a further object of this invention is to provide a new and improved structure for striking the rod of a mechanical transmitter thereby generating its natural resonant frequency which includes means for adjusting the energy which is imparted to the rod.

In carrying out this invention, a vibrator or rod is mounted on a support structure by a U-shaped clip which fits in a groove made around the circumference of the rod at a nodal point thereon. A push-button having an arm on one end thereof contacts an arm for pivoting a hammer which strikes the rod. An adjustable stop means is provided for controlling the impact imparted to the rod by the hammer. The other end of the push-button is provided with an arm having a resilient damping member thereon for contacting the opposite end of the bar for damping out vibrations on the release of the push-button.

The invention, both as to organization and method of operation, together with further objects and advantages thereof may best be understood by reference to the following description taken in connection with the accompanying drawing.

The drawing is a perspective view with certain parts broken away for illustrative purposes of the new and improved structure for holding, actuating and damping a mechanical rod-type transmitter.

Referring now to the drawing, the mechanical transmitter embodied in this invention includes a vibrator or rod 10 having a natural reasonant frequency which is dependent upon the mass and length of the rod. The rod 10 is provide with a cylindrical groove about a nodal point on the rod which generally occurs at the mid-point of the rod. The rod 10 is mounted on a base 16 by a clip 12 housed in a pair of supports 14 and 15 which are mounted on the base 16. The clip 12 fits into the cylindrical groove in the rod 10 and provides a firm mounting means which is nevertheless resilient enough to allow the rod to vibrate at its natural resonant frequency when struck. As will be seen from the drawing, the clip 12 engages the rod 10 at a plurality of points along the periphery of the groove formed in the rod 10, and it circumscribes the rod 10 a little over one-half of its circumference. This particular type of mounting provides an assembly advantage in that the clip 12 may occupy a variety of positions on the rod 10 as distinguished from the type of mounting which requires the rod to be positioned in a particular manner and to contact its holding means at specific points.

A striking or actuating mechanism for the mechanical transmitter includes a push-button 18 having an intermediate portion 22, an arm 20 one one end thereof and an arm 21 on the other end thereof. The push-button 18 is mounted at its intermediate portion 22 for pivotal movement about a bearing 23 in the support 15. The intermediate portion 22 of push-botton 18 is provided with a pair of stops 17 and 19 which, in cooperation with the support member 15, restrict pivotal movement of the push-button 18 in either its depressed or undepressed position. A spring 50 is attached to the arm 21 and to a screw 51 in the base 16 for biasing the push-button 18 to its unactivated or undepressed position. The arm 21 also carries a resilient spoon-shaped damping member 54 which is in frictional engagement with one of rod 10 when the push-button is in its unactuated or undepressed position.

The remaining actuating structure for the mechanical transmitter includes a bearing 26 mounted in a pair of supports 27 and 29 which are mounted on the base 16. The bearing 26 carries an arm 24 and an arm 28 which are tied together by a bolt or link 30. The arm 24 has an extension 25 thereon and a channel 31 therein. The arm 28 carries a resilient finger 33 having a hammer 38 mounted thereon. A spring 32 is mounted on the bearing 26 and is attached to the resilient finger 33. A bracket 36 carries a stop screw 34 which is adapted to contact the resilient finger 33 in a manner to be described. The link 30 which interconnects arms 24 and 28 also carries a spring 52 which is attached to the extension 25 of arm 24 to bias the arm 24 in the position shown in the drawing.

In operation when the push-button 18 is depressed, it pivots the arm 20 about bearing 23 to contact the extension 25 on arm 24 thereby rotating arm 24 about the bearing 26. Since arms 24 and 28 are interconnected by the link 30, arm 28 also rotates about bearing 26 away from the vibrator or rod 10. When arm 20 is pivoted far enough by the depression of the push-button 18, it slides by arm 24 and allows the spring 32 which has been compressed to drive the arms 24 and 28 toward the rod 10. The stop screw 34 stops the resilient finger 33 short of the rod 10, but centrifugal force carries the center of the arm 28 past the stop screw 34 momentarily allowing the hammer 38 to strike the rod 10 and set up longitudinal vibrations of the natural resonant frequency of the rod 10. Since the energy stored in the spring 32 is released when the hammer 38 strikes the rod and the stop screw 34 also dissipates some of the stored energy, further contact of the hammer 38 with the rod 10 is prevented.

When the push-button 18 is released, the spring 50 which has been loaded by the depression of the push-button pulls on arm 21, and accordingly arm 20 against the underside of extension 25 on the arm 24. This causes the arm 24 to pivot about link 30 with the arm 24 sliding in its channel 31 along bearing 26 to allow the arm 20 to pass and return to its original unactuated position. In so doing the spoon-shaped damper element 54 slides against the end of rod 10 and any further vibrations of the rod 10 are damped.

Accordingly, a very inexpensive structure is provided for holding, striking, preventing repetitive striking, and damping of a longitudinal mode rod-type mechanical transmitter which can be utilized for transmitting signals for remote actuation of electrical circuits. As will be obvious, more than one remote function can be controlled by duplicating the structure shown with a plurality of rods all having different resonant frequencies. The number of rods used would depend on the number of remote control functions to be controlled.

Since other modifications varied to fit particular operating requirements and environments will be apparent to those skilled in the art, the invention is not considered limited to the examples chosen for purposes of disclosure and covers all changes and modifications which do not constitute departures from the true spirit and scope of this invention.

What I claim as new and desire to secure by Letters Patent of the United States is:

1. A mechanical transmitter for use in a remote control system comprising a rod having a natural resonant frequency, a support means, clamping means mounting said rod on said support means for vibratory movement therein, a push-button pivotally mounted on said support means, a bearing, means mounting said bearing on said supoprt means adjacent one end of said rod, a pivotal arm carried by said bearing which is adapted to be activated by said push-button having a resilient finger mounted thereon, a hammer mounted on said finger and positioned near said one end of said rod, a tensioning means mounted on said bearing and attached to said finger which is placed under tension when said pivotal arm is pivoted away from said rod by said push-button, said push-botton when activated rotating said pivot arm and tensioning said tensioning means, said push-button releasing said pivot means after a predetermined interval, a stationary stop means positioned on said support means adjacent said one end of said rod contacting said finger when said pivot arm is released, the energy of said spring carrying said hammer into sharp contact with the end of said rod setting said rod into longitudinal vibrations and thereby transmitting the natural resonant frequency of said rod, and a second tensioning means mounted on said support means and attached to said push-button for returning said push-button to its unactivated position.

2. The mechanical transmitter as set forth in claim 1 in which said rod has a cylindrical groove therein around its circumference, and said clamping means comprises a U-shaped clip which fits in said cylindrical groove.

3. The mechanical transmitter as set forth in claim 1 including a resilient means on said push-button for damping the other end of said rod when said push-button is returned to its unactivated position.

4. A mechanical transmitter for use in a remote control system comprising a rod having a natural resonant frequency, a support means, means for mounting said rod on said support means for vibratory movement when struck on an end thereof, a hammer mounted on a resilient support adjacent one end of said rod, a stationary stop means mounted on said support means adjacent said one end of said rod contacting said resilient support and preventing said hammer from contacting said rod in its unactivated position, a first pivot arm and a second pivot arm mounted on a bearing for pivotal movement thereon at one end of said arms, said bearing being mounted on said support means adjacent said one end of said rod, means linking said arms on the other end portion thereof, means mounting said resilient support carrying said hammer on said second pivot arm, a spring mounted on said bearing and attached to said resilient support carrying said hammer which is tensioned when said arms are pivoted, a push-button mounted on said support means and having means thereon for pivoting said arms and thereby loading said spring, means on said first pivot arm to release said arms from said push-button after a predetermined pivoting thereof thereby allowing said spring to supply energy to said hammer for striking said rod, said stop means preventing further contact by said hammer with said rod, and means mounted on said support means and attached to said push-button for restoring said push-button to its unactivated position on being released.

5. The mechanical transmitter as set forth in claim 4 including a resilient means on said push-button for damping the end of said rod opposite said hammer when said push-button is released.

References Cited in the file of this patent
UNITED STATES PATENTS 2,728,902   White et al.  ------------- Dec. 27, 1955
2,920,604   McDonald  -------------- Jan. 12, 1960